(12) United States Patent
Gao

(10) Patent No.: US 12,103,286 B2
(45) Date of Patent: Oct. 1, 2024

(54) DECORATIVE FUNCTIONAL FILM AND ELECTRONIC DEVICE REAR COVER MODULE

(71) Applicant: SHINE OPTOELECTRONICS (KUNSHAN) CO., LTD., Kunshan (CN)

(72) Inventor: Yulong Gao, Kunshan (CN)

(73) Assignee: Shine Optoelectronics (Kunshan) Co., Ltd., Kushan (CN)

( * ) Notice: Subject to any disclaimer, the term of this patent is extended or adjusted under 35 U.S.C. 154(b) by 999 days.

(21) Appl. No.: 17/043,596

(22) PCT Filed: Apr. 11, 2019

(86) PCT No.: PCT/CN2019/082288
§ 371 (c)(1),
(2) Date: Sep. 29, 2020

(87) PCT Pub. No.: WO2019/214389
PCT Pub. Date: Nov. 14, 2019

(65) Prior Publication Data
US 2021/0029234 A1    Jan. 28, 2021

(30) Foreign Application Priority Data

May 9, 2018   (CN) .......................... 201810439442.4
Jun. 15, 2018  (CN) .......................... 201810622963.3

(51) Int. Cl.
*B32B 3/30*   (2006.01)
*B32B 3/26*   (2006.01)
(Continued)

(52) U.S. Cl.
CPC ................ *B32B 3/30* (2013.01); *B32B 3/263* (2013.01); *B32B 7/12* (2013.01); *B32B 27/36* (2013.01);
(Continued)

(58) Field of Classification Search
CPC .. B32B 3/30; B32B 3/263; B32B 7/12; B32B 27/36; B32B 33/00; B32B 2307/402;
(Continued)

(56) References Cited

U.S. PATENT DOCUMENTS

| | | | |
|---|---|---|---|
| 11,691,377 B2 * | 7/2023 | Gao | B32B 3/30 428/141 |
| 2007/0269635 A1 | 11/2007 | Morozumi et al. | |

(Continued)

FOREIGN PATENT DOCUMENTS

| | | |
|---|---|---|
| CN | 2894205 Y | 4/2007 |
| CN | 101470566 A | 7/2009 |

(Continued)

OTHER PUBLICATIONS

CN-206684337-U Machine Translation (Year: 2017).*
JP-2008162260-A Machine Translation (Year: 2008).*
International Search Report from corresponding International Application No. PCT/CN2019/082288 mailed on Jul. 4, 2019, 4 pages with translation.

*Primary Examiner* — Travis M Figg
(74) *Attorney, Agent, or Firm* — Tucker Ellis LLP

(57) ABSTRACT

A decorative functional film, comprising: a carrier comprising a first surface and a second surface provided opposite the first surface; a micro-nano layer, a micro-nano structure being provided on the first surface of the carrier to form the micro-nano layer, and the micro-nano structure being a convex and/or concave structure; a reflective layer provided on the micro-nano layer; a coloring layer provided on the reflective layer; and a display structure provided on one side of the carrier by means of an adhesive layer. The display structure can be a luminous LOGO, or can display indication information, for example, relatively simple indication information such as power and signals; and the display structure can change the indication information by changing the (Continued)

display area, display brightness and display duration of the display structure, or by changing the number of display grids of the display structure.

8 Claims, 12 Drawing Sheets

(51) Int. Cl.
    *B32B 7/12*     (2006.01)
    *B32B 27/36*     (2006.01)
    *B32B 33/00*     (2006.01)
    *G02B 3/00*     (2006.01)
    *G02B 5/28*     (2006.01)
    *H04M 1/02*     (2006.01)

(52) U.S. Cl.
    CPC ........ *B32B 33/00* (2013.01); *B32B 2307/402* (2013.01); *B32B 2307/416* (2013.01); *G02B 3/0037* (2013.01); *G02B 5/28* (2013.01); *H04M 1/0283* (2013.01)

(58) Field of Classification Search
    CPC .. B32B 2307/416; G02B 3/0037; G02B 5/28; H04M 1/0283
    See application file for complete search history.

(56) References Cited

U.S. PATENT DOCUMENTS

| | | | |
|---|---|---|---|
| 2012/0075168 A1* | 3/2012 | Osterhout | G06F 3/017 345/8 |
| 2014/0216788 A1 | 8/2014 | Zhou et al. | |
| 2016/0154244 A1* | 6/2016 | Border | H05B 45/12 359/630 |
| 2016/0187654 A1* | 6/2016 | Border | G02B 27/0172 359/630 |
| 2021/0029233 A1 | 1/2021 | Gao | |

FOREIGN PATENT DOCUMENTS

| | | | |
|---|---|---|---|
| CN | 101932210 A | | 12/2010 |
| CN | 104291016 A | | 1/2015 |
| CN | 206387924 U | | 8/2017 |
| CN | 206584059 U | * | 10/2017 |
| CN | 107332958 A | | 11/2017 |
| CN | 206684337 U | * | 11/2017 |
| CN | 207304637 U | | 5/2018 |
| CN | 208827232 U | | 5/2019 |
| JP | 2008162260 A | * | 7/2008 |

* cited by examiner

DECORATIVE FUNCTIONAL FILM AND ELECTRONIC DEVICE REAR COVER MODULE

The present application claims priority to Chinese Patent Application No. 201810622963.3, with a title of "DECORATIVE FUNCTIONAL FILM AND ELECTRONIC DEVICE REAR COVER MODULE", filed in the Chinese National Intellectual Property Administration on Jun. 15, 2018, and priority to Chinese Patent Application No. 201810439442.4, with a title of "DECORATIVE FUNCTIONAL FILM AND ELECTRONIC DEVICE REAR COVER MODULE", filed in the Chinese National Intellectual Property Administration on May 9, 2018, the contents of which are incorporated herein by reference in their entirety.

TECHNICAL FIELD

The present application relates to the technical field of electronic products, and particularly to a decorative functional film and an electronic device rear cover module.

BACKGROUND

With the continuous development of electronic technology, consumer electronic products are closely related to daily life. For example, smart phones are an indispensable and accompanied item for consumers. Consumers are also paying more attention to user experience. However, the existing smart phones cannot satisfy the individual demand, as their appearance and functions tend to be similar. In this regard, differentiation in the appearance and function has become a breakthrough for smartphones. A rear cover of a smart phone is, for example, one of the important components of the mobile phone, but the rear covers of the existing smart phones are structural components with a monotonous appearance.

SUMMARY

In view of above, the present disclosure provides a decorative functional film, for solving the above technical problems.

One technical solution of the decorative functional film according to the present disclosure is described below.

A decorative functional film includes: a carrier including a first surface and a second surface opposite to the first surface; a micro-nano layer formed by a micro-nano structure provided on the first surface of the carrier, the micro-nano structure being at least one of a protruding structure or a recessed structure; a reflective layer provided on the micro-nano layer; a coloring layer provided on the reflective layer; and a display structure provided on a side of the carrier via an adhesive layer.

In an embodiment, the decorative functional film further includes a substrate layer provided on the second surface of the carrier.

In an embodiment, the display structure is provided on a side of the substrate layer facing away from the carrier via the adhesive layer.

In an embodiment, the display structure is provided on a side of the carrier facing away from the substrate layer via the adhesive layer.

In an embodiment, the display structure is provided on a side of the micro-nano layer facing away from the substrate layer via the adhesive layer.

In an embodiment, the display structure is provided on a side of the reflective layer facing away from the substrate layer via the adhesive layer.

In an embodiment, the display structure is provided on a side of the coloring layer facing away from the substrate layer via the adhesive layer.

In an embodiment, the decorative functional film further includes a second micro-nano layer disposed on any surface of the carrier. The micro-nano layer and the second micro-nano layer each exhibit a respective optical effect, or the micro-nano layer and the second micro-nano layer interfere with each other to form an optical effect.

In an embodiment, the micro-nano structure is at least one of a linear cylindrical lens, a non-linear cylindrical lens, a micro lens, a small short line, a Fresnel lens, drawing lines, or a CD pattern.

An electronic device rear cover module includes the decorative functional film according to any one of the aforementioned embodiments.

The present disclosure has the following beneficial effects. The decorative functional film is provided with the micro-nano layer, the reflective layer, the coloring layer and the functional layer, and thus has both decorative and functional properties

DESCRIPTION OF EMBODIMENTS

Figure 1:
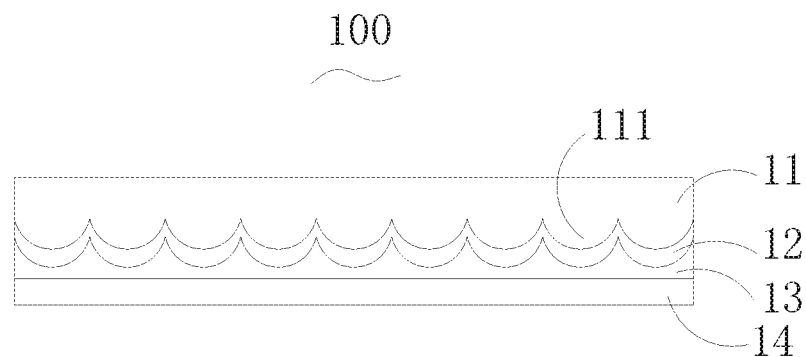
FIG. 1 is a schematic cross-sectional view of a decorative functional film according to the present disclosure.

For the purpose of understanding the present disclosure, the present disclosure is described in a more comprehensive manner with reference to drawings. The preferable embodiments of the present disclosure are illustrated in the drawings. However, the present disclosure can be implemented in many different forms and is not limited to these embodiments described below. On the contrary, these embodiments are provided for the purpose of the thorough and comprehensive explanation of the present disclosure.

Unless otherwise defined, all technical and scientific terms used herein have the same meanings as these that those skilled in the art know in the technical field of the present disclosure. The terms used in the description of the present disclosure is merely intended to describe specific embodiments, but not intended to limit the present disclosure. The term "and/or" as used herein includes any and all combinations of one or more of the listed items.

The present disclosure provides a decorative functional film, having both decorative and functional properties. The decorative functional film includes a micro-nano layer, and a micro-nano structure in the micro-nano layer has optical effects such as a reflective effect, a refractive effect, a transmission effect on light, thereby producing the optical effects and enhancing the decorative effect. The decorative functional film further includes a functional layer, which has functions of antenna, display, touch, wireless charging, near field communication (NFC), active light-emitting, etc.

The present disclosure further provides an electronic device rear cover module including the decorative functional film. The electronic device rear cover module has good decorative and functional properties, satisfying the individual demand on appearance and function. Taking a smart phone as an example, the decorative functional film is applied to a rear cover of the phone. First of all, the decorative functional film enhances the decorative effect of the mobile phone, and can produce optical effects, such as light cross, three-dimensional effects, etc., and the display of colors and patterns is more obvious and clear or more dazzling. Secondly, the functionality of the mobile phone is improved, for example, the rear cover of the mobile phone is integrated with: an antenna module having antenna function; a display module for displaying battery status, calls, information, reminder, etc.; a touch module having functions such as sliding unlocking, fingerprint unlocking, volume adjustment, page turning, switching on and off, etc.; a wireless charging module having charging function; an NFC module having functions of payment, card scanning, and other functions; and a light-emitting module having functions such as active light-emitting, additional decoration or information reminder, etc.

Preferably, a decorative functional film includes a micro-nano layer, an appearance layer and a functional layer that are sequentially stacked. The stacking sequence of the micro-nano layer, the appearance layer and the functional layer is not limited. Each of the micro-nano layer, the appearance layer and the functional layer can include one layer or multiple layers which can be continuous stacked or stacked with intervals. The micro-nano layer includes a plurality of protruding and/or recesses micro-nano structures, and the plurality of micro-nano structures produces special optical effects on light. The appearance layer includes at least one of a reflective layer, a coloring layer, a colored layer, or a graphic layer, displaying the color, graphic and text of the rear cover. The micro-nano layer in cooperation with the appearance layer, enhances the display effect of the appearance layer, which is brighter, clearer, more three-dimensional, more dazzling, etc.; or it can form optical images, 3D images, suspended images, etc.; or it can form rainbow patterns, interference pattern, tiger skin pattern, CD pattern, etc.; or it can form light and shadow bright patterns, including straight lines, curved lines, dots, cones, apertures, etc. The functional layer includes an antenna module, a display module, a touch module, a wireless charging module, an NFC module, a light-emitting module, etc., that include of conductive wires, conductive grids, light-emitting materials, display materials, etc. The functional layer can exert its functions by itself, or it can cooperate with the micro-nano layer and the appearance layer to exert its functions: graphics and text light-emitting, graphics and text variations, light and shadow variations, etc. The optical effects of the micro-nano layer, the color of the appearance layer, graphics, etc. can be set corresponding to the functional layer, which serves as a mark for the functional layer. For example, corresponding to the touch module of the functional layer, the appearance layer is provided with a corresponding arrow mark, the arrow mark turns left to indicate turning a page backward, or the arrow mark turns right to indicate tuning a page backward. In other embodiments, the decorative functional film can merely include the appearance layer and the functional layer without being provided with the micro-nano layer, and the appearance layer includes at least one of the reflective layer, the coloring layer, the colored layer, or the graphic layer. For example, the appearance layer includes the graphic layer matching the functional layer. For example, the graphic layer is in a shape of a battery, and the functional layer is a light-emitting or display module, and the battery level can be correspondingly displayed in the graphic layer.

Specifically, a decorative functional film includes a micro-nano layer, a reflective layer, the coloring layer, and a functional layer that are sequentially stacked. The micro-nano layer includes a plurality of protruding and/or recessed micro-nano structures, the reflective layer is coated on and covers the micro-nano structures, the coloring layer is coated on the reflective layer, and the functional layer is formed on the coloring layer.

Preferably, the micro-nano layer is a UV resin layer, and the micro-nano structure is a protruding and/or recessed structure formed by embossing and molding. The micro-nano structure reflects and refracts light to produce optical effects. Generally, the UV resin layer is a transparent colorless layer, but it can also be a colored UV resin with a certain transmittance. The colored UV resin can be used with the reflective layer and the coloring layer to develop a color of the decorative functional film, or it can develop a color of the decorative functional film by itself. When the colored UV resin develop a color of the decorative functional film by itself, the appearance layer is the micro-nano layer. The micro-nano structure can be at least one of a linear cylindrical lens, a non-linear cylindrical lens, a micro lens, a short line, a Fresnel lens, a brushed pattern, a CD pattern, or the like. The micro-nano structures can be arranged at intervals and/or without intervals. A cross-sectional the micro-nano structure can be in shape of triangle, quadrilateral, polygon, arc, special shape, etc. The parameters of the micro-nano structures can all the same or some of them can be different from each other, and the parameters include type, shape, length, width, height, curvature, angle, depth, position, etc.

Preferably, the reflective layer is a metal or non-metal layer plated on the micro-nano structure layer and having a reflective effect, which improves the optical effect and also provides colors for the decorative functional film. The coloring layer is formed on the reflective layer and is usually a dark ink layer. The coloring layer is configured to display colors in conjunction with the reflective layer and block the display of the functional layer on the other side.

Preferably, the functional layer is a conductive layer formed by processes such as laser light printing, laser, and embossing. The conductive layer can be conductive wires or conductive grids directly arranged on the coloring layer; or the UV resin is coated on the coloring layer and embossed to form grooves, and then the grooves are filled with a conductive material to form the conductive wires or the conductive grids. The conductive wire or conductive grids can form an antenna, a wireless charging coil, a touch grid, an NFC grid, etc.

Preferably, the functional layer further includes an insulating protective layer covering the conductive layer, and the conductive layer further includes a contact portion that is not covered by the insulating protective layer. The contact portion is configured to be electrically connected to an external circuit, etc.

Preferably, the functional layer is formed on a side of the micro-nano layer facing away from the reflective layer. The functional layer includes a conductive layer or a display layer. The conductive layer includes conductive wires or conductive grids, and the conductive layer can form an antenna, a wireless charging coil, a touch grid, an NFC grid, etc. A width of the conductive wire or a grid line of the conductive layer falls outside the visible range of human eyes, or the conductive material of the conductive layer is a transparent conductive material such as ITO. The conductive wires or the grid lines of the conductive layer can also be visible to the human eye, or the conductive layer can be arranged outside the display or hid in the graphic layer. The display layer is an OLED display layer, an LED display layer, or a liquid crystal display layer, etc. It can be a transparent layer such as an OLED display layer, or a visible layer. When it is a visible layer, it occupies a local part of the decorative functional film.

Preferably, a decorative functional film and an electronic device rear cover module include a decorative layer and a display structure. The decorative layer includes a carrier; a micro-nano structure layer formed by a micro-nano structure provided on a side of the carrier; a reflective layer provided on a side of the micro-nano structure layer having the micro-nano structure; a coloring layer provided on a side of the reflective layer facing away from the micro-nano structure layer; and a display structure provided on a side of the carrier via an adhesive layer. The carrier can be formed of a heat-cured or light-cured polymer. In this case, the carrier and the micro-nano structure layer are formed as an integral structure. Alternatively, the carrier includes a substrate layer and a heat-cured or light-cured adhesive layer, the micro-nano structure is provided on a side of the heat-cured or light-cured adhesive layer facing away from the substrate layer to form the micro-nano structure layer. The display structure is provided on a side of the carrier facing away from the micro-nano structure layer via the adhesive layer; or the display structure is provided on a side of the micro-nano structure layer having the micro-nano structure via the adhesive layer, in this case, the decorative layer is provided with a visual window corresponding to the display structure area, allowing the information displayed by the display structure to be visible to the user from a side of the rear cover. In another embodiment, the display structure is arranged on a side of the reflective layer via the adhesive layer. In another embodiment, the display structure is arranged on the side of the coloring layer through the adhesive layer. When the display structure is arrange on a side of the decorative layer having the micro-nano structure layer, the decorative layer is provided with a visual window corresponding to the display structure area, allowing the information displayed by the display structure to be visible to the user from a side of the rear cover. The display structure described here can be a luminous LOGO or can display indication information, for example, battery level, signal and other relatively simple indication information. The indication information can vary by changing a display area, a display brightness, a display duration or the number of display grids of the display structure. The display structure can be PMOLED, AMOLED, LCM, etc., or it can be a light-emitting diode.

Preferably, the decorative functional film further includes a second micro-nano layer disposed on a side of the micro-nano layer facing away from the reflective layer. The micro-nano layer and the second micro-nano layer can each form a respective optical effect, or the micro-nano layer and the second micro-nano layer interfere with each other to form an optical effect. The decorative functional film further includes a graphic layer disposed on a side of the micro-nano layer facing away from the reflective layer. The graphic layer can be formed by embossing and filling with a filler after embossing. The graphic layer is adapted to the micro-nano layer to image and/or the graphic layer corresponds to the functional layer.

Preferably, the decorative functional film further includes a carrier layer disposed on a side of the micro-nano layer facing away from the reflective layer. The carrier layer is a PET layer, a PC layer, a PI layer, etc. The carrier layer is coated with the UV resin, the UV resin is embossed and cured to form the micro-nano layer. The carrier layer may further include an adhesive layer on a side facing away from the micro-nano layer. The adhesive layer is configured to adhere the decorative functional film to a substrate such as glass, thereby forming an electronic device rear cover module. At least one of a second micro-nano layer, a graphic layer, or a colored layer can be provided on a side of the carrier layer facing away from the micro-nano layer.

Specifically, a decorative functional film includes a micro-nano layer, a reflective layer, and a functional layer that are sequentially stacked. The micro-nano layer includes a plurality of protruding and/or recessed micro-nano structures, the reflective layer is provided on the micro-nano structure, and the functional layer is formed on the reflective layer. In this case, the reflective layer has the functions of reflection, color developing and blocking.

Specifically, a decorative functional film includes an adhesive layer, a carrier layer, a micro-nano layer, a reflective layer, a coloring layer, and a functional layer that are sequentially stacked.

Preferably, the functional layer includes a conductive layer, and the conductive layer includes a conductive grid and a lead extending from the conductive grid. The UV resin is embossed to form grooves that are in communication with each other, and the grooves are filled with a conductive material to form the conductive grid.

Specifically, a decorative functional film includes a second micro-nano layer or a graphic layer or a colored layer, a carrier layer, a micro-nano layer, a reflective layer, a reflective layer, a coloring layer, and a functional layer that are sequentially stacked.

Preferably, the functional layer includes a conductive layer, and the conductive layer includes a conductive grid and a lead extending from the conductive grid. The UV resin is embossed to form grooves that are in communication with each other, and the grooves are filled with a conductive material to form the conductive grid.

Specifically, a decorative functional film includes a functional layer, a carrier layer, a micro-nano layer, a reflective layer, and a coloring layer that are sequentially stacked.

Preferably, the functional layer includes a conductive layer, and the conductive layer includes a conductive grid and a lead extending from the conductive grid. The UV resin is embossed to form grooves that are in communication with each other, and the grooves are filled with a conductive material to form the conductive grid.

Specifically, a decorative functional film includes a carrier layer, a functional layer, a micro-nano layer, a reflective layer, and a coloring layer that are sequentially stacked.

Preferably, the functional layer includes a conductive layer, and the conductive layer includes a conductive grid and a lead extending from the conductive grid. The UV resin is embossed to form grooves that are in communication with each other, and the grooves are filled with a conductive material to form the conductive grid.

Specifically, a decorative functional film includes a micro-nano layer, a carrier layer, a reflective layer, a coloring layer, and a functional layer that are sequentially stacked.

Preferably, the functional layer includes a conductive layer, and the conductive layer includes a conductive grid and a lead extending from the conductive grid. The UV resin is embossed to form grooves that are in communication with each other, and the grooves are filled with a conductive material to form the conductive grid.

In summary, some of the adhesive layer, the carrier layer, the micro-nano layer, the colored layer, the reflective layer, the coloring layer, the conductive layer, the display layer, the insulating protective layer, etc., can be combined as required to form the decorative functional film of present disclosure, which has both decorative and functional properties.

The present disclosure further discloses an electronic device rear cover module including the above-mentioned decorative functional film. In the electronic device rear cover module, glass, plastic, or metal is used as the substrate, and the decorative functional film is attached on the substrate via an adhesive layer or directly formed on the substrate. The decorative functional film included in the electronic device rear cover module is not only a structural component, but also has a certain degree of functionality in addition to good decorative property, thereby satisfying the individual demands. Taking smart phones as an example, the design of the micro-nano layer and the appearance layer allows the appearance design of the rear cover of the mobile phone to be different from the conventional design, and has a very good decorative effect. In the meantime, the rear cover of the mobile phone is integrated with a functional module, on which some functions of the mobile phone, such as switching on and off, page turning, volume adjustment, battery level display, call, wireless charging, NFC, and active light emission and other functions can be provided in the rear cover module. The functional layer is stacked on the micro-nano layer and the appearance layer. The functional layer basically does not increase the thickness of the rear cover of the mobile phone, but has certain functions, and cooperates with the micro-nano structure, color, graphics, etc., to achieve the best customer experience. In this regard, the mobile phones are not only structural components, but also have both decorative and functional properties. The functional module of the functional layer includes the conductive layer as the main structure. The conductive layer is arranged on a side of the coloring layer facing away from the micro-nano layer and reflective layer, and thus will not affect the appearance. For example, the conductive grids of the conductive layer form an antenna which cannot be seen from the outside when the antenna is arranged in the coloring layer. Thus, the common three-section housing can be abandoned. The conductive layer can also be arranged on one or two sides of the carrier layer and can be visible or invisible to the human eyes. When it is visible, it can be directly presented or designed as a certain pattern, for example, the conductive lines of the conductive layer are arranged along the mobile phone logo. When it is invisible, the transparent conductive materials such as ITO can be adopted, or the conductive layer cooperating with the micro-nano layer and/or the graphic layer makes itself invisible. The leads of the conductive layer can extend to the inside through the edge of the rear cover, partial blind holes or camera holes, so as to be electrically connected to components such as batteries.

Specifically, an electronic device rear cover module includes a substrate, a micro-nano layer, a reflective layer, a coloring layer, and a conductive layer. Preferably, the substrate, the micro-nano layer, the reflective layer, the coloring layer, and the conductive layer are stacked in sequence. Preferably, an adhering layer is provided between the coloring layer and the conductive layer. The conductive layer includes solid conductive wires or a conductive grid, and the solid conductive wires or the conductive grid has contacts or leads.

Specifically, an electronic device rear cover module includes a substrate, an adhesive layer, a carrier layer, a micro-nano layer, a reflective layer, a coloring layer, and a conductive layer. Preferably, the substrate, the adhesive layer, the carrier layer, the micro-nano layer, the reflective layer, the coloring layer, and the conductive layer are stacked in sequence. Preferably, an adhering layer is provided between the coloring layer and the conductive layer. The conductive layer includes solid conductive wires or a conductive grid, and the solid conductive wires or the conductive grid has contacts or leads.

Specifically, an electronic device rear cover module includes a substrate, an adhesive layer, a conductive layer, a carrier layer, a micro-nano layer, a reflective layer, and a coloring layer that are sequentially stacked. The conductive layer includes solid conductive wires or a conductive grid, and the solid conductive wires or the conductive grid has contacts or leads. The leads extend to a side of the coloring layer facing away from the reflective layer through the side of the substrate or perforation.

The decorative functional film and the electronic device functional module according to the present disclosure are described with reference to drawings.

FIG. 1 to FIG. 5 illustrate several embodiments of a decorative functional film 100.

Referring to FIG. 1, a decorative functional film 100 includes a micro-nano layer 11, a reflective layer 12, a coloring layer 13, and a functional layer 14 that are sequentially stacked. The micro-nano layer 11 includes a plurality of protruding micro-nano structures 111. In the present embodiment, the micro-nano structures 111 are a plurality of micro-lenses that is arranged. The reflective layer 12 is a metal layer plated on the micro-nano structure 111. The coloring layer 13 is a base ink layer. The coloring layer 13 and the reflective layer 12 provide the decorative functional film 100 with colors, and thus the reflective layer 12 and the coloring layer 13 are the appearance layer of the decorative functional film 100. The functional layer 14 is a conductive layer, the conductive layer includes a plurality of conductive grids and a plurality of leads electrically connected to the plurality of conductive grids, and gold fingers are exposed and provided at ends of the leads. The conductive layer can be a conductive layer for antennas, touch, wireless charging, and NFC. The functional layer 14 can include an antenna module, a touch module, a wireless charging module, or an NFC module, etc., to allow the decorative functional film 100 to have both decorative and functional properties. In other embodiments, the micro-nano layer 11 is a colored UV resin.

Figure 2:
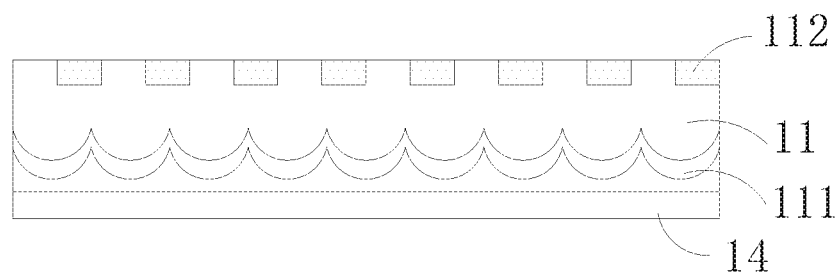
FIG. 2 is another schematic cross-sectional view of a decorative functional film according to the present disclosure.

Preferably, referring to FIG. 2, a graphic structure 112 is formed after a side of the micro-nano layer 11 (for the convenience of clear description, similar layers in different embodiments of the same type of decorative functional film are denoted with the same reference signs) facing away from the micro-nano structure 111 is embossed and filled. The graphic structure 112 can be configured to provide color, indication or logo. The micro-nano structure 111 can make the graphic structure 112 brighter and clearer, and can also allow the graphic structure 112 to have a three-dimensional effect or allow the graphic structure 112 to image. The graphic structure 112 can also be used with the functional layer 14. For example, the graphic structure 112 is "+" and "−", and the functional layer 14 has a touch function, the volume is turned up or the page is turned backwards agter clicking "+", and the volume is turned down or the page is turned forwards agter clicking "−".

Figure 3:
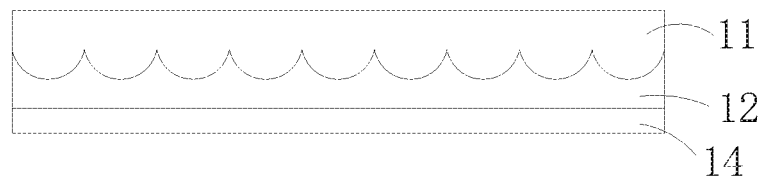
FIG. 3 is yet another schematic cross-sectional view of a decorative functional film according to the present disclosure.

Preferably, referring to FIG. 3, the decorative functional film 100 includes a micro-nano layer 11, a reflective layer 12, and a functional layer 14 that are stacked sequentially. The reflective layer 12 is relatively thick, and the reflective layer 12 has both the functions of reflection and base ink.

Figure 4:
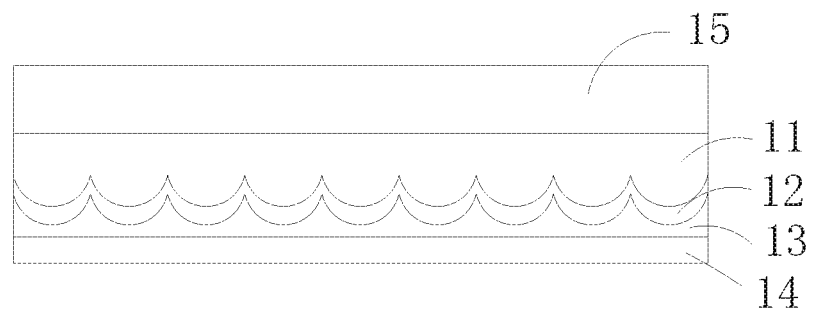
FIG. 4 is yet another schematic cross-sectional view of a decorative functional film according to the present disclosure.

Preferably, referring to FIG. 4, the decorative functional film 100 further includes a carrier layer 15. In an embodiment, the carrier layer 15 is a PET layer. The PET layer is a colored layer or a colorless transparent layer. The carrier layer 15 serves as a substrate layer and a supporting layer, and the micro-nano layer 11, the reflective layer 12, the colored layer 13 and the functional layer 14 are sequentially formed on the carrier layer 15.

Figure 5:
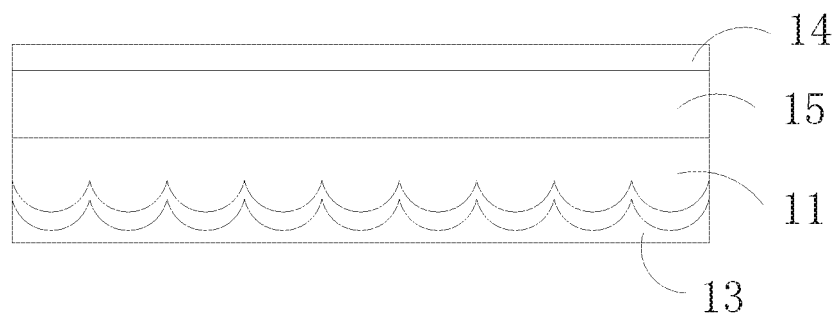
FIG. 5 is yet another schematic cross-sectional view of a decorative functional film according to the present disclosure.

Preferably, referring to FIG. 5, the functional layer 14 is disposed on a side of the carrier layer 15 facing away from the micro-nano layer 11. Without the shielding of the coloring layer 13, the functional layer 14 can be a conductive layer, and the conductive layer can be hidden under the graphics, formed special pattern, or use a transparent conductive material (such as ITO). The functional layer 14 can also be configured as a display module and a light-emitting module. The display module can be, for example, an OLED display, a liquid crystal display, and the like. The light-emitting module can be, for example, OLED light-emitting or LED light-emitting, etc. The functional layer 14 is electrically connected to a power, a chip, etc. through leads.

FIG. 6 to FIG. 15 illustrate various embodiments of a decorative functional film 200.

Figure 6:
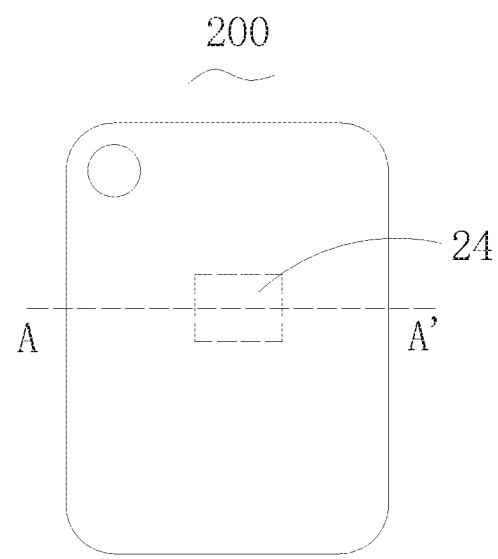
FIG. 6 is a schematic plan view of a decorative functional film according to the present disclosure.
Figure 7:
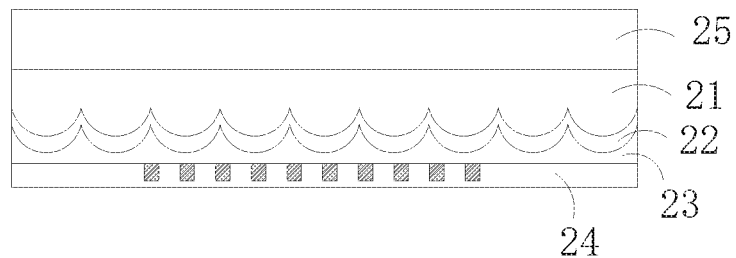
FIG. 7 is a schematic cross-sectional view alone line A-A' shown in FIG. 6.

Referring to FIG. 6 and FIG. 7, a decorative functional film 200 is in a sheet shape, and includes a carrier layer 25, a micro-nano layer 21, a reflective layer 22, the coloring layer 23, and a functional layer 24 that are sequentially stacked. The functional layer 24 has a touch function and is used as the touch area on the entire film 200. The functional layer 24 includes conductive grids printed or lasered on the coloring layer 23 and an insulating protective layer covering the conductive grids. The touch function can be switching on/off, volume, page turning, fingerprint recognition, etc. At the same time, the touch area can be darker/lighter in color and have light spots, etc. to distinguish itself from other areas.

Figure 8:
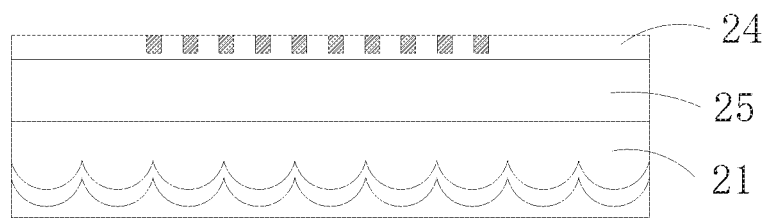
FIG. 8 is another schematic cross-sectional view of a decorative functional film shown in FIG. 7.

Preferably, referring to FIG. 8, the functional layer 24 is disposed on a side of the carrier layer 25 facing away from the micro-nano layer 21. The conductive grids of the functional layer 24 can adopt invisible thin lines, or transparent lines to present a transparent state, and it can also adopt visible solid lines to make the touch area more obvious.

Figure 9:
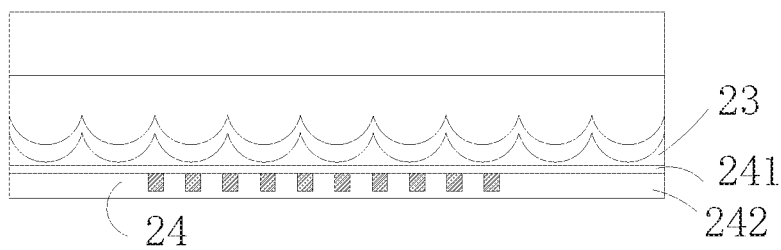
FIG. 9 is yet another schematic cross-sectional view of a decorative functional film shown in FIG. 7.

Preferably, referring to FIG. 9, the functional layer 24 includes a adhering layer 241 and a conductive layer 242. The functional layer 24 is adhered to the coloring layer 23 via the adhering layer 241. The conductive layer 242 is formed by embossing the UV resin to form grooves and filling the grooves with the conductive material, and after being formed on other substrate, it is adhered via the adhering layer 241.

Figure 10:
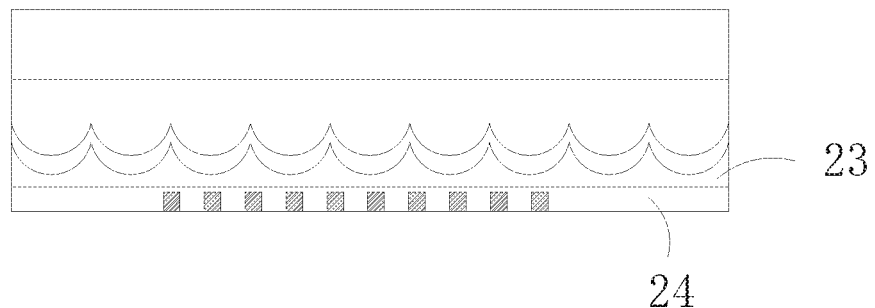
FIG. 10 is yet another schematic cross-sectional view of a decorative functional film shown in FIG. 7.

Preferably, referring to FIG. 10, the UV resin is coating on the coloring layer 23, the UV resin is embossed to form grooves, and the grooves are filled with the conductive material to form the functional layer 24.

Figure 11:
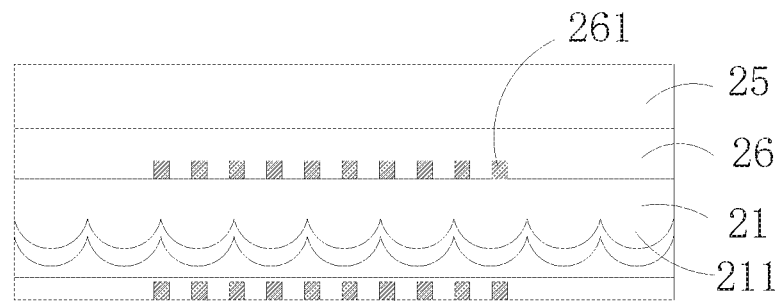
FIG. 11 is yet another schematic cross-sectional view of a decorative functional film shown in FIG. 7.

Preferably, referring to FIG. 11, the functional decorative film 200 further includes a graphic layer 26 located between the micro-nano layer 21 and the carrier layer 25. The graphic layer 26 can be text, logo, indicator icon, color, etc., which allows the touch area to be more obvious. The graphic layer 26 includes a graphic structure 261 formed by embossing the UV resin and then filling the embossed UV resin. The micro-nano structure 211 can make the graphic structure 261 more clear and obvious or present 3D effects or imaging.

Figure 12:
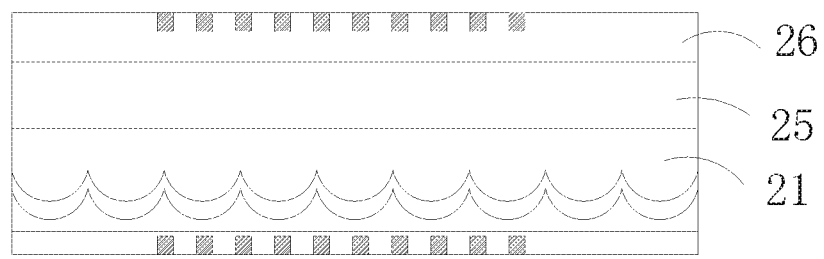
FIG. 12 is yet another schematic cross-sectional view of a decorative functional film shown in FIG. 7.

Preferably, referring to FIG. 12, the graphic layer 26 is formed on a side of the carrier layer 25 facing away from the micro-nano layer 21.

Figure 13:
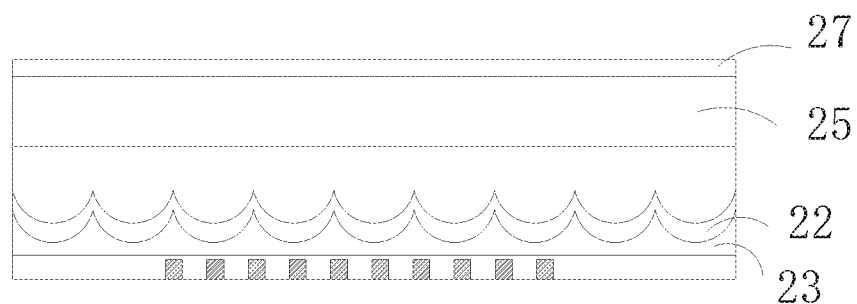
FIG. 13 is yet another schematic cross-sectional view of a decorative functional film shown in FIG. 7.

Preferably, referring to FIG. 13, the functional decoration film 200 further includes a colored layer 27 disposed on the carrier layer 25. The colored layer 27 can develop color for the functional decoration film 200 alone, or can cooperate with the reflective layer 22 and the coloring layer 23 to develop color. In other embodiments, the colored layer can also be located between the carrier layer and the micro-nano layer.

Figure 14:
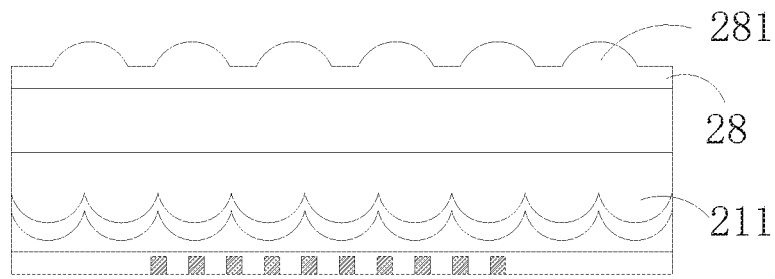
FIG. 14 is yet another schematic cross-sectional view of a decorative functional film shown in FIG. 7.

Preferably, referring to FIG. 14, the functional decoration film 200 further includes a second micro-nano layer 28. The second micro-nano layer 28 includes a plurality of second protruding micro-nano structures 281. The plurality of second protruding micro-nano structures 281 is a plurality of cylindrical lenses arranged at intervals. The micro-nano structure 211 and the second micro-nano structure 281 have respective optical effects, or can interfere with each other to form a new optical effect.

Figure 15:
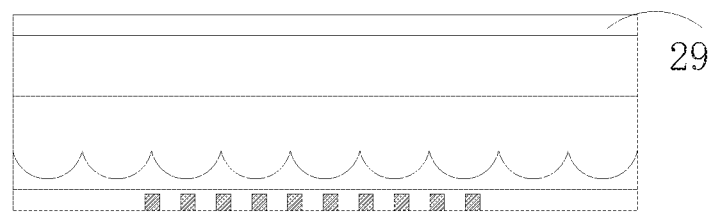
FIG. 15 is yet another schematic cross-sectional view of a decorative functional film shown in FIG. 7.

Preferably, referring to FIG. 15, the functional decorative film 200 further includes an adhesive layer 29. A release film can be carried on the adhesive layer 29 to facilitate transportation. The adhesive layer 29 is configured to adhere the functional decoration film 200 to a glass panel or the like.

FIG. 16 to FIG. 19 illustrate several embodiments of an electronic device rear cover module 300.

Figure 16:
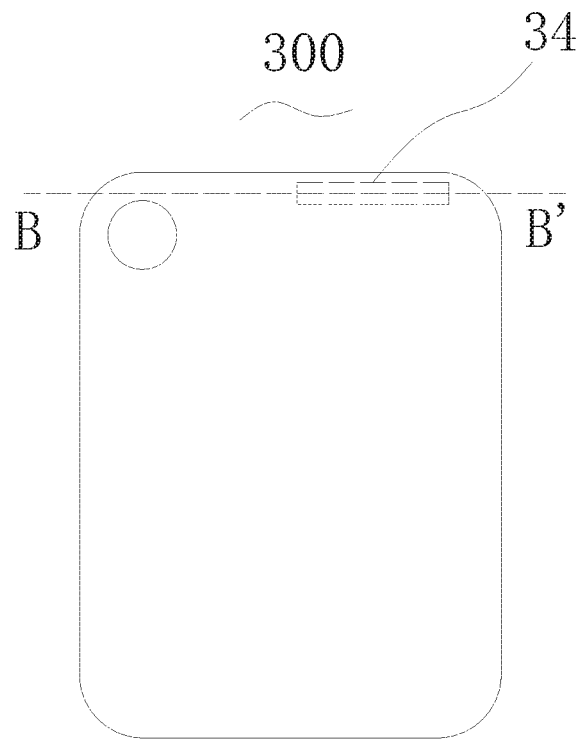
FIG. 16 is a schematic plan view of an electronic device rear cover module according to the present disclosure.
Figure 17:
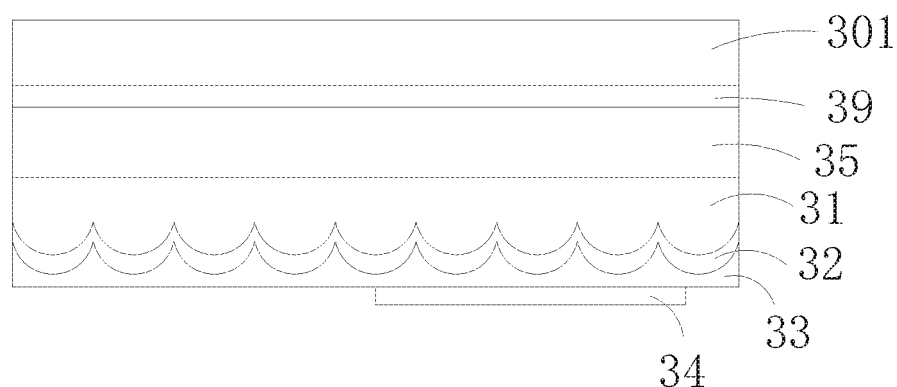
FIG. 17 is a schematic cross-sectional view alone line B-B' shown in FIG. 16.

Referring to FIG. 16 and FIG. 17, the electronic device rear cover module 300 includes a substrate 301, an adhesive layer 39, a carrier layer 35, a micro-nano layer 31, a reflective layer 32, a coloring layer 33, and a functional layer 34 that are sequentially arranged. The functional layer 34 is located at an upper end of the rear cover module 300 and provided with a conductive grid therein to form an antenna of the electronic device rear cover module 300. The functional layer 34 includes an antenna provided at an upper end of the coloring layer 33 through printing or laser processing. The antenna can be a conductive solid line or a conductive grid. The substrate 301 is transparent glass. Taking the rear cover of a mobile phone as an example, the substrate 301 is arranged on an outer layer, the coloring layer 33 blocks the inside of the mobile phone, and the antenna is arranged on a side of the coloring layer 33 facing away from the micro-nano layer 31. Thus, the antenna can be completely hidden, which is a breakthrough in the design of the rear cover of the mobile phone.

Figure 18:
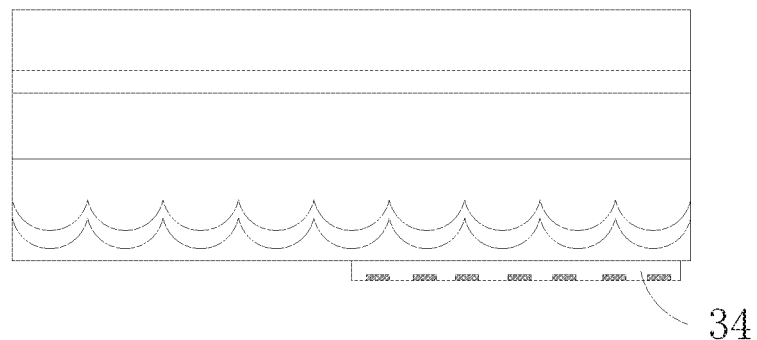
FIG. 18 is another schematic cross-sectional view of an electronic device rear cover module shown in FIG. 17.

Referring to FIG. 18, the functional layer 34 is formed by embossing the UV resin to form grooves and filling the grooves with a conductive material. In other embodiments, the functional layer can also be provided on one or two sides of the carrier layer, and can be filled with colored or colorless conductive material as needed.

Figure 19:
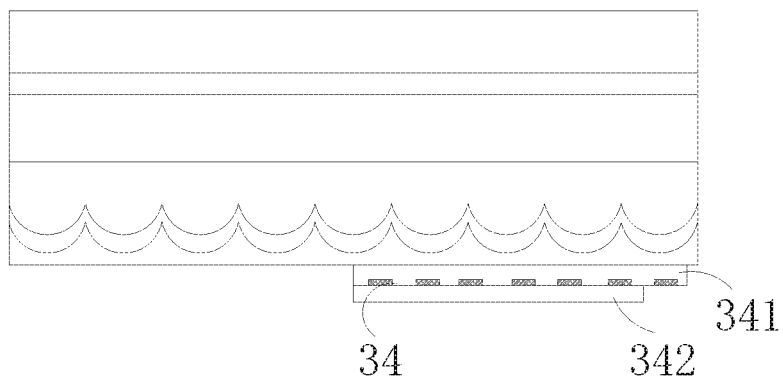
FIG. 19 is yet another schematic cross-sectional view of an electronic device rear cover module shown in FIG. 17.

Referring to FIG. 19, the functional layer 34 further includes a conductive layer 341 and an insulating protection layer 342 covering the conductive layer 341. The insulating protective layer 342 does not cover a contact portion of the conductive layer 341, and can be electrically connected to the internal structure of the mobile phone through the contact portion.

FIG. 20 to FIG. 23 illustrate several embodiments of an electronic device rear cover module 400.

Figure 20:
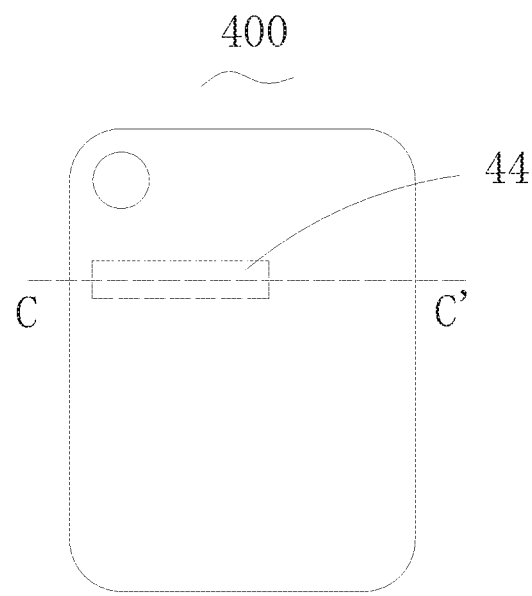
FIG. 20 is a schematic plan view of an electronic device rear cover module according to the present disclosure.
Figure 21:
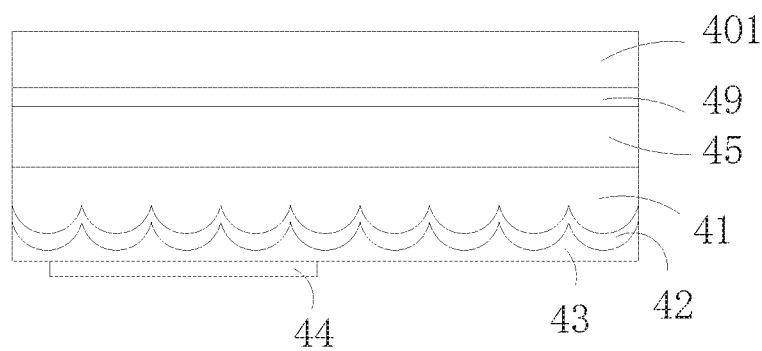
FIG. 21 is a schematic cross-sectional view alone line C-C' shown in FIG. 20.

Referring to FIG. 20 and FIG. 21, the electronic device rear cover module 400 includes a substrate 401, an adhesive layer 49, a carrier layer 45, a micro-nano layer 41, a reflective layer 42, the coloring layer 43, and a functional layer 44 that are sequentially arranged. Further taking a mobile phone as an example, the functional layer 44 can achieve the functions such as wireless charging or NFC. For example, the functional layer 44 includes a coil for a wireless charging in mobile phone. When the mobile phone is placed on a wireless charging base, it can be coupled with the coil of the wireless charging base to charge the mobile phone.

Figure 22:
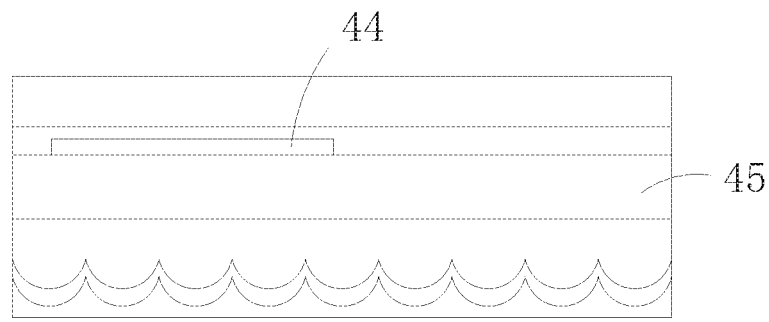
FIG. 22 is another schematic cross-sectional view of an electronic device rear cover module shown in FIG. 21.

Preferably, referring to FIG. 22, the functional layer 44 is provided on the carrier layer 45. The functional layer 44 can achieve the functions such as wireless charging, NFC, display, and light emission. For example, the functional layer 44 includes an OLED module, and the OLED module includes a cathode, an anode, and an organic material disposed between the cathode and the anode. The OLED module can emit light or display, for example, caller identification and information reminder.

Figure 23:
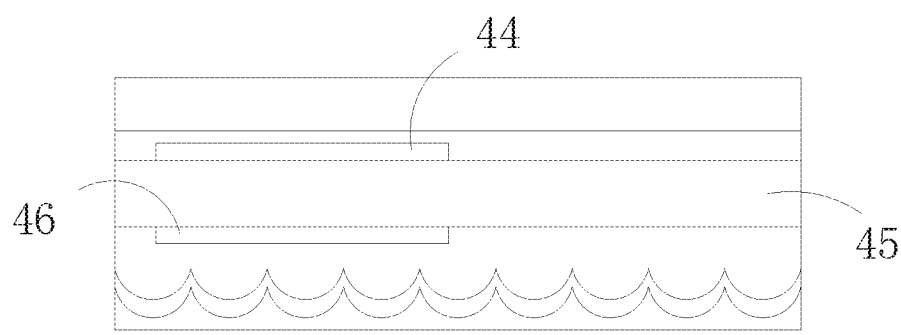
FIG. 23 is yet another schematic cross-sectional view of an electronic device rear cover module shown in FIG. 21.

Preferably, referring to FIG. 23, the electronic device rear cover module 400 further includes a graphic layer 46 provided on the carrier layer. The graphic layer 46 and the functional layer 44 are separately arranged on two sides of the carrier layer 45, and certainly, the positions thereof can be interchanged or they can be located on one side of the carrier layer 45. The graphic layer 46 can highlight the functional area or indicate the functional area. It can also be a predetermined logo and be highlighted by light emitted from the functional layer. The OLED module can be connected to the battery and other components by bypassing or penetrating the rear cover module through borders, camera holes.

Figure 24:
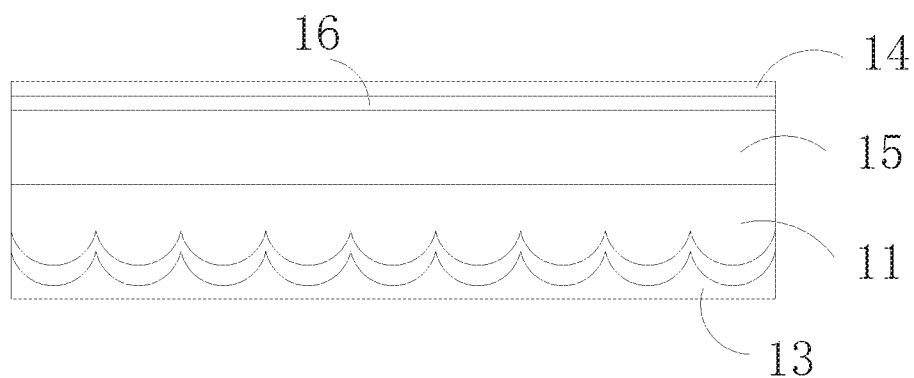
FIG. 24 is another schematic cross-sectional view of a decorative functional film according to the present disclosure.

Referring to FIG. 24, the functional layer 14 is connected to the carrier layer or the carrier 15 through the adhering layer 16. The functional layer 14 can be a display structure, and the functional layer 14 is located on a side of the carrier layer 15 facing away from the micro-nano layer or the micro-nano structure layer 11.

Figure 25A:
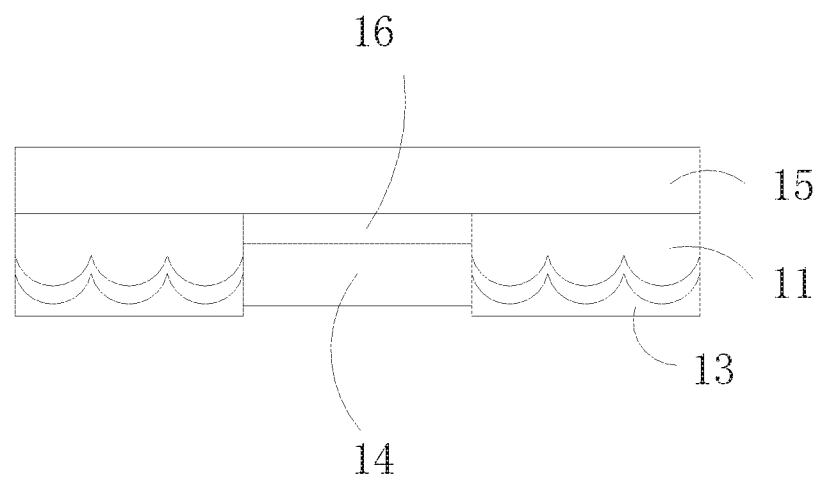
FIG. 25a is yet another schematic cross-sectional view of a decorative functional film according to the present disclosure.
Figure 25B:
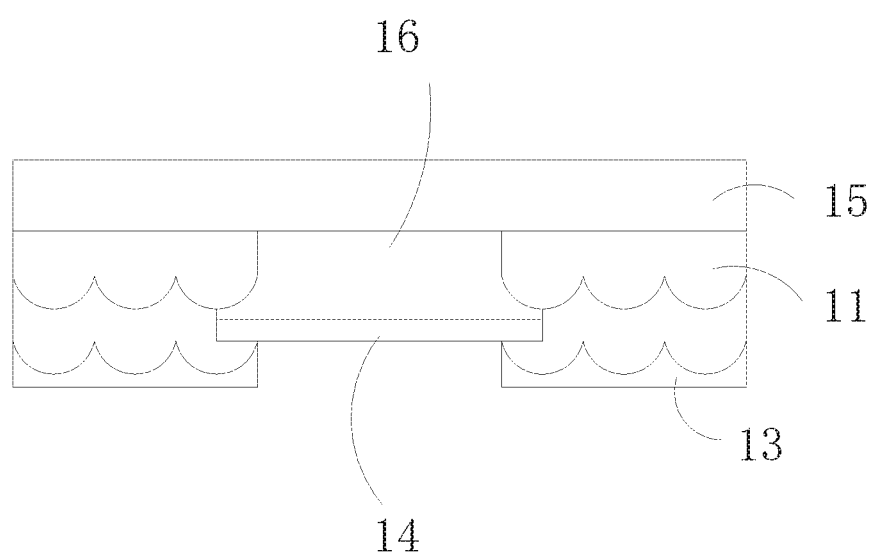
FIG. 25b is yet another schematic cross-sectional view of a decorative functional film according to the present disclosure.
Figure 25C:
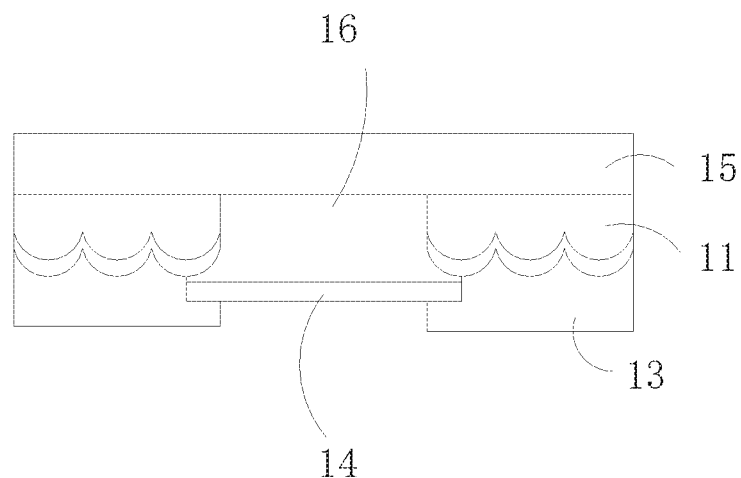
FIG. 25c is yet another schematic cross-sectional view of a decorative functional film according to the present disclosure.
Figure 25D:
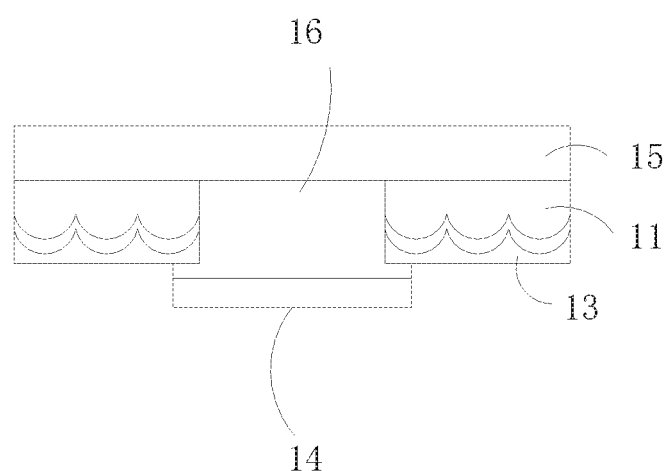
FIG. 25d is yet another schematic cross-sectional view of a decorative functional film according to the present disclosure.
Figure 25E:
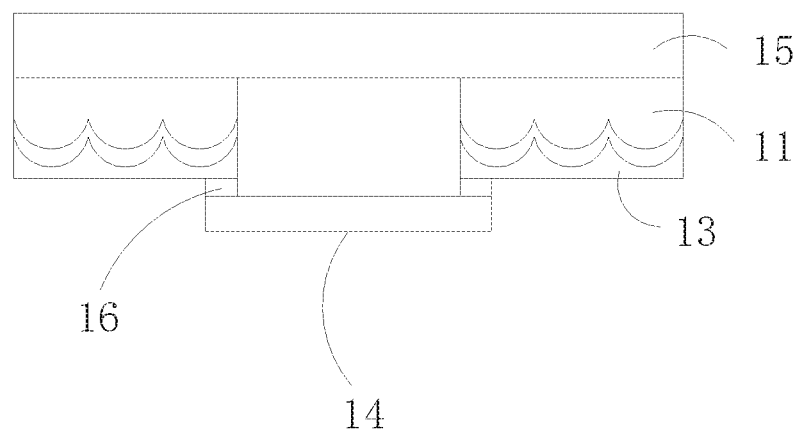
FIG. 25e is yet another schematic cross-sectional view of a decorative functional film according to the present disclosure.

Referring to FIG. 25a to FIG. 25e, the functional layer 14 is provided on another side of the carrier layer or the carrier 15 through the adhering layer 16. The functional layer 14 can be a display structure. The functional layer 14 and the micro-nano layer 11 can be located on the same side of the carrier or carrier layer 15, in this case, the side where the micro-nano layer is located serves as a visual window, and the functional layer is located in a visual window area. In FIG. 25a, the functional layer 14 is directly adhered to the carrier layer 15 through the adhering layer 16. In FIG. 25b, the functional layer 14 is directly adhered a side of the micro-nano layer 11 facing away from the carrier layer 15 through the adhering layer 16. In FIG. 25c, the functional layer 14 is directly adhered to a side of the reflective layer facing away from the micro-nano layer 11 through the adhering layer 16. In FIG. 25d, the functional layer 14 is directly adhered to a side of the coloring layer 13 facing away from the reflective layer through the adhering layer 16. In FIG. 25e, the functional layer 14 is directly adhered to a side of the coloring layer 13 facing away from the reflective layer through the adhering layer 16, but the adhering layer 16 is located on the coloring layer 13, and there is no adhesive material in the visible window area; certainly, the visible window area of the structure shown in FIG. 25b to FIG. 25e can have a micro-nano structure.

Therefore, the appearance layer provides the rear cover of the electronic device with colors or graphics, provides special optical effects in combination of the micro-nano layer, and at the same time, the functional layer is integrated to meet individual demands. The rear cover of electronic device is not only a structural component, but also has market value.

The embodiments of the present disclosure are described in detail above with reference to the accompanying drawings, for the purposes of explaining the above objectives, features, and advantages of the present disclosure. In the above description, many specific details are explained in order to fully understand the present disclosure. However, the present disclosure can be implemented in many ways other than those described above. Those skilled in the art can make similar improvements without contradicting the connotation of the present disclosure. Therefore, the present disclosure is not limited by the specific embodiments disclosed above. Moreover, the technical features of the above-mentioned embodiments can be combined arbitrarily. For the concise reason, all possible combinations of the various technical features in the above-mentioned embodiments are not described. However, as long as the technical features are not contradictory to each and cannot be combined, all the combinations should be considered within the scope of this specification.

The above are merely several embodiments of the present disclosure, and the description is specific and detailed, but it should not be understood as a limitation of the scope of the present disclosure. It should be pointed out that those skilled in the art can make various modifications and improvements without departing from the concept of the present disclosure, which shall all fall within the protection scope of the present disclosure. The protection scope of the present disclosure patent shall be determined by the appended claims.

What is claimed is:

1. A decorative functional film, comprising:
a carrier comprising a first surface and a second surface opposite to the first surface;
a micro-nano layer formed by a micro-nano structure provided on the first surface of the carrier, the micro-nano structure being at least one of a protruding structure or a recessed structure, wherein the micro-nano layer has optical effects comprising a reflective effect, a refractive effect, and a transmission effect on light;
a reflective layer provided on the micro-nano layer, wherein the reflective layer has functions of reflection, color developing and blocking;
a coloring layer provided on the reflective layer, wherein the coloring layer is configured to display colors in conjunction with the reflective layer;
a decorative layer comprising the carrier;
a functional layer comprising an antenna module, a display module, a touch module, a wireless charging module, an NFC module, a light-emitting module, that include of conductive wires, conductive grids, light-emitting materials and display materials, wherein the reflective layer or the coloring layer is provided, corresponding to the touch module of the functional layer, with an arrow mark to match graphics and text variations of the functional layer; and
a display structure provided on a side of the coloring layer, wherein the decorative layer is provided with a visual window corresponding to a display structure area, allowing information displayed by the display structure to be visible to a user;
the decorative functional film further comprising:
a second micro-nano layer disposed on any surface of the carrier, wherein the micro-nano layer and the second micro-nano layer each exhibit an optical effect, or the micro-nano layer and the second micro-nano layer interfere with each other to form an optical effect; and
wherein the micro-nano structure is at least one of a linear cylindrical lens, a non-linear cylindrical lens, a micro lens, a small short line, a Fresnel lens, drawing lines, or a CD pattern.

2. The decorative functional film according to claim 1, further comprising:
a substrate layer provided on the second surface of the carrier.

3. The decorative functional film according to claim 2, wherein the display structure is provided on a side of the substrate layer facing away from the carrier via the adhesive layer.

4. The decorative functional film according to claim 2, wherein the display structure is provided on a side of the carrier facing away from the substrate layer via the adhesive layer.

5. The decorative functional film according to claim 4, wherein the display structure is provided on a side of the micro-nano layer facing away from the substrate layer via the adhesive layer.

6. The decorative functional film according to claim 4, wherein the display structure is provided on a side of the reflective layer facing away from the substrate layer via the adhesive layer.

7. The decorative functional film according to claim 4, wherein the display structure is provided on a side of the coloring layer facing away from the substrate layer via the adhesive layer.

8. An electronic device rear cover module, comprising the decorative functional film according to claim 1.

* * * * *